(12) United States Patent
Kagawa et al.

(10) Patent No.: US 9,161,109 B2
(45) Date of Patent: Oct. 13, 2015

(54) LOUDSPEAKER, AND ELECTRONIC APPARATUS AND MOBILE DEVICE USING THE LOUDSPEAKER

(71) Applicant: Panasonic Corporation, Osaka (JP)

(72) Inventors: Shinya Kagawa, Mie (JP); Goro Tsuchiya, Mie (JP); Koji Sano, Mie (JP); Akihiro Yogo, Mie (JP); Kenichi Ajiki, Mie (JP); Mitsukazu Kuze, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/113,814

(22) PCT Filed: Apr. 16, 2013

(86) PCT No.: PCT/JP2013/002557
§ 371 (c)(1),
(2) Date: Oct. 25, 2013

(87) PCT Pub. No.: WO2013/161214
PCT Pub. Date: Oct. 31, 2013

(65) Prior Publication Data
US 2014/0093119 A1 Apr. 3, 2014

(30) Foreign Application Priority Data

Apr. 27, 2012 (JP) ................. 2012-102223

(51) Int. Cl.
*H04R 1/02* (2006.01)
*H04R 1/26* (2006.01)
*H04R 9/02* (2006.01)
*B60R 11/02* (2006.01)

(52) U.S. Cl.
CPC .............. *H04R 1/02* (2013.01); *B60R 11/0217* (2013.01); *H04R 1/26* (2013.01); *H04R 9/02* (2013.01); *H04R 2499/13* (2013.01)

(58) Field of Classification Search
USPC .......................................... 381/335, 336, 386
See application file for complete search history.

(56) References Cited

U.S. PATENT DOCUMENTS

| 7,931,115 | B2 * | 4/2011 | Silver ............................. 181/171 |
| 8,397,861 | B1 * | 3/2013 | Xu et al. ........................ 181/171 |
| 2006/0188123 | A1 * | 8/2006 | Sasaki et al. .................. 381/386 |
| 2010/0059309 | A1 | 3/2010 | Kajihara et al. |

FOREIGN PATENT DOCUMENTS

| JP | 01-120197 | 5/1989 |
| JP | 07-095687 | 4/1995 |
| JP | 2002-142290 | 5/2002 |

(Continued)

OTHER PUBLICATIONS

Japanese version of International Search Report of PCT Application No. PCT/JP2013/002557 dated Jul. 16, 2013.

*Primary Examiner* — Davetta W Goins
*Assistant Examiner* — Amir Etesam
(74) *Attorney, Agent, or Firm* — Panasonic Patent Center (57) ABSTRACT

A loudspeaker includes a diaphragm, a magnetic circuit, and a frame. The frame includes an outer peripheral part supporting the diaphragm, a center part supporting the magnetic circuit, and a connection part connecting the center part to the outer peripheral part. The outer peripheral part molded with resin includes an inner wall, an outer wall facing the inner wall, and a reinforcing rib provided between the inner wall and the outer wall.

12 Claims, 7 Drawing Sheets

(56) References Cited

FOREIGN PATENT DOCUMENTS

| JP | 2006-229522 | 8/2006 |
| JP | 2008-160360 | 7/2008 |
| JP | 2008-193371 | 8/2008 |

\* cited by examiner

LOUDSPEAKER, AND ELECTRONIC APPARATUS AND MOBILE DEVICE USING THE LOUDSPEAKER

TECHNICAL FIELD

The present invention relates to a loudspeaker used for vehicle, various audio apparatuses, or the like, and it also relates to an electronic apparatus and a mobile device using the loudspeaker.

BACKGROUND ART

Recently, in automobile industry, weight reduction for improvement of fuel consumption and resource saving are being strictly required from the viewpoint of global environmental friendliness. Therefore, also in an on-vehicle loudspeaker mounted on a car, market demand for weight reduction and resource saving cannot be avoided. From the above-mentioned background, in loudspeakers mainly used for vehicles, for the purpose of weight reduction and resource saving, a resin frame is becoming mainstream instead of a metal frame that has been frequently used conventionally.

Figure 10:
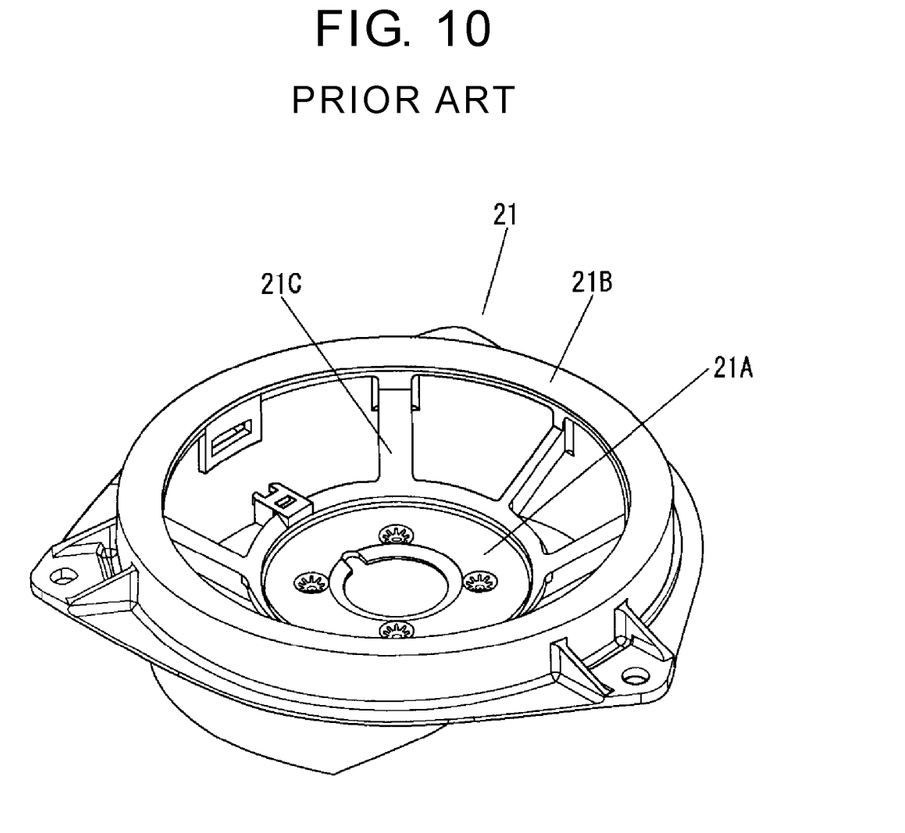
FIG. 10 is a perspective view of a conventional loudspeaker frame.

Hereinafter, a conventional loudspeaker frame is described with reference to a drawing. FIG. 10 is a perspective view of a conventional loudspeaker frame. Frame 21 is formed of resin by injection-molding.

Frame 21 includes center part 21A, outer peripheral part 21B, and connection parts 21C connecting center part 21A to outer peripheral part 21B. In frame 21, in order to obtain strengths equal to those of metal frames that have been frequently used conventionally, each part has a material thickness necessary for securing a strength.

Examples of information on prior art documents related to the invention of this application include patent literatures 1 and 2.

CITATION LIST

Patent Literature

PTL 1: Japanese Patent Unexamined Publication No. 2008-193371
PTL 2: Japanese Patent Unexamined Publication No. H07-095687

SUMMARY OF THE INVENTION

A loudspeaker of the present invention includes a diaphragm and a magnetic circuit, which are supported by a loudspeaker frame made of resin. The frame includes a center part supporting the magnetic circuit, an frame-shaped outer peripheral part supporting the diaphragm, and a connection part connecting the center part to the outer peripheral part. The outer peripheral part includes an inner wall and an outer wall which face each other, and a reinforcing rib provided between the inner wall and the outer wall.

With such a configuration, while a material thickness of the frame is reduced, a strength can be secured by the reinforcing rib provided perpendicularly on the side wall. As a result, while the strength of the frame is secured, weight reduction of the frame and resource saving can be achieved.

Thus, the loudspeaker frame according to the present invention can contribute to global environmental friendliness by weight reduction and resource saving, and has a great effect capable of achieving low cost, high quality, and high reliability.

DESCRIPTION OF EMBODIMENTS

Prior to description of an exemplary embodiment of the present invention, problems in a conventional loudspeaker are described. In a loudspeaker using frame 21 shown in FIG. 10, in particular, for reducing distortion due to installation to an automobile or the like, it is important to secure a strength of outer peripheral part 21B that also functions as an installation member to an automobile or the like. Therefore, it is necessary to increase a material thickness of outer peripheral part 21B.

Indeed, the specific gravity of material can be reduced by changing from a metal frame to a resin frame. However, when a material thickness necessary for securing a strength equal to that of the metal frame is set, as a result, weight cannot be sufficiently reduced.

However, further weight reduction of a loudspeaker is required with respect to market demand for weight reduction for improvement of fuel consumption and resource saving, which is increasingly becoming stricter from the viewpoint of global environmental friendliness.

Figure 1:
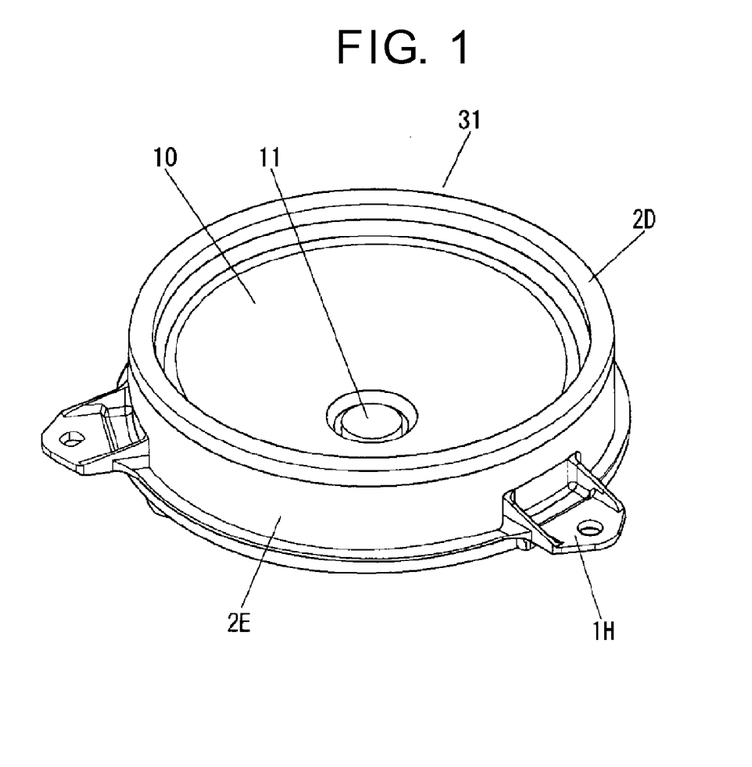
FIG. 1 is a perspective view of a loudspeaker according to an exemplary embodiment of the present invention.
Figure 2:
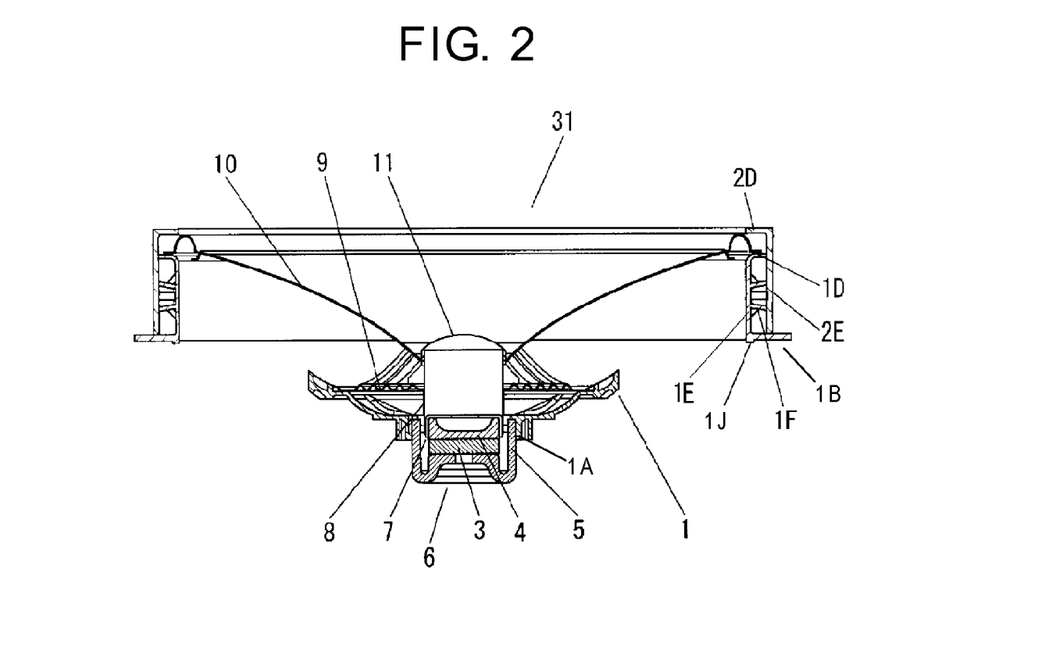
FIG. 2 is a sectional view of the loudspeaker shown in FIG. 1.
Figure 3:
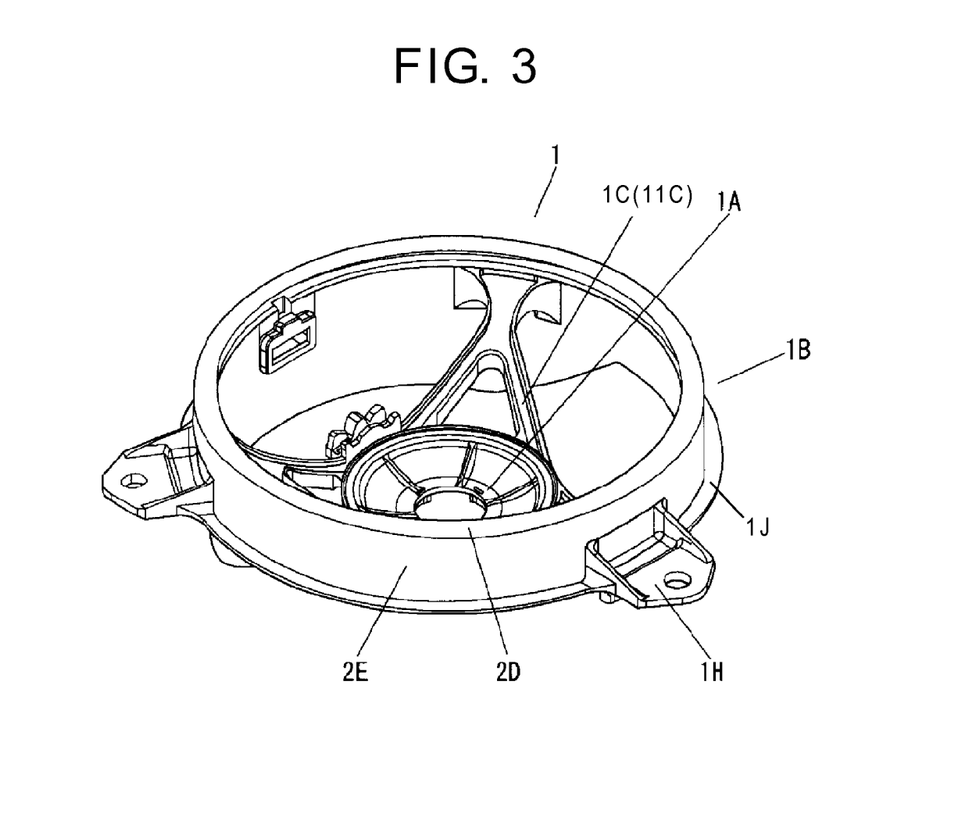
FIG. 3 is a perspective view of a frame used for the loudspeaker shown in FIG. 1.
Figure 4:
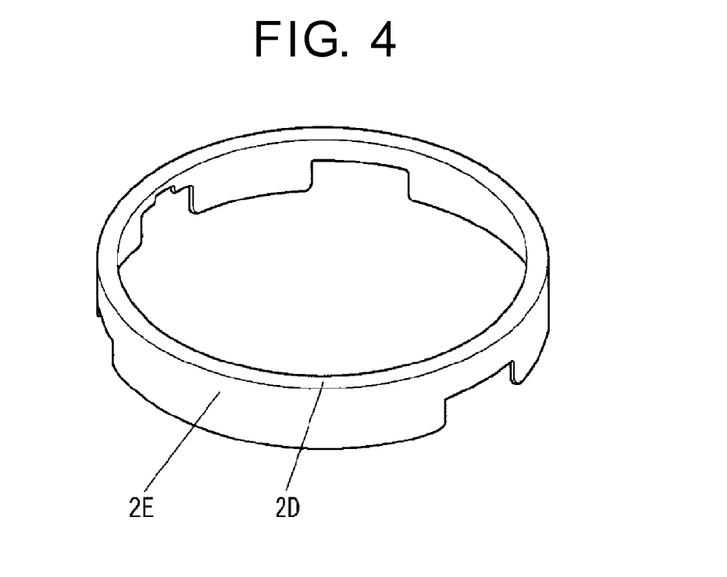
FIG. 4 is perspective view of an outer wall of the frame shown in FIG. 3.
Figure 5:
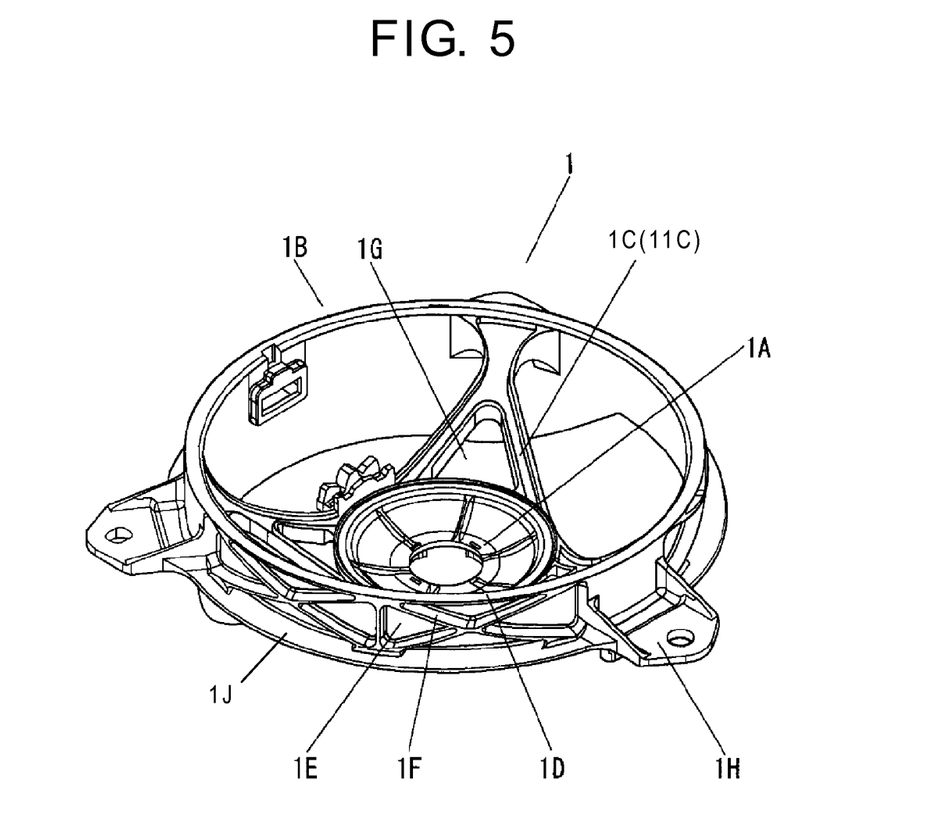
FIG. 5 is a perspective view of the frame shown in FIG. 3 in which the outer wall is omitted.
Figure 6:
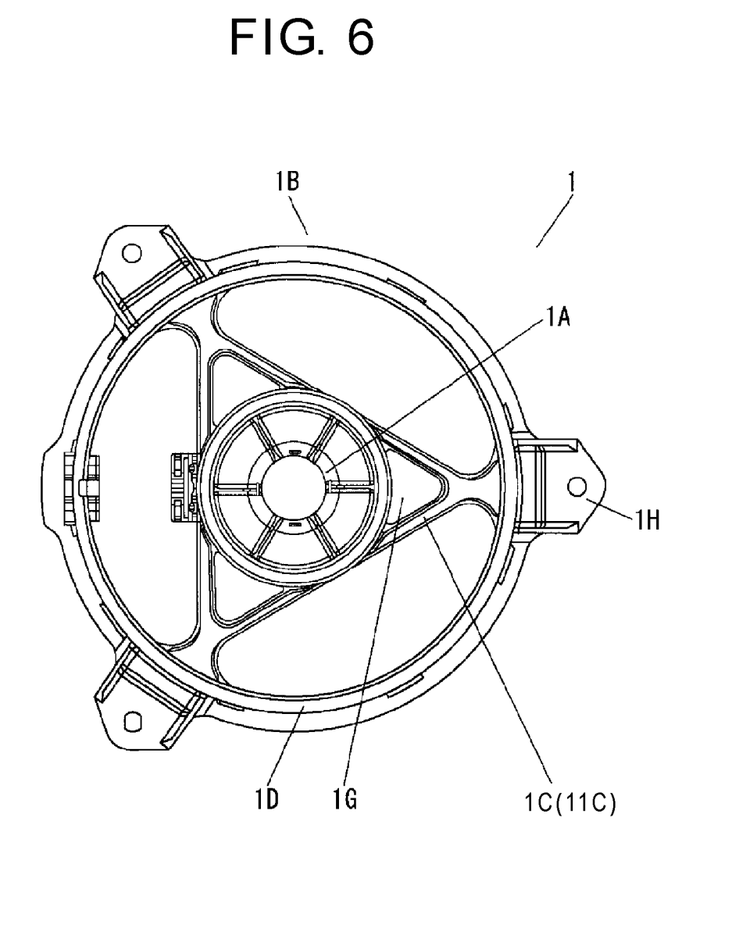
FIG. 6 is a plan view of the frame in which the outer wall is omitted shown in FIG. 5.

Hereinafter, the exemplary embodiment of the present invention is described. FIG. 1 is a perspective view of a loudspeaker in accordance with the exemplary embodiment of the present invention, and FIG. 2 is a sectional view thereof. FIG. 3 is a perspective view of a loudspeaker frame used in the exemplary embodiment. FIG. 4 is a perspective view of an outer wall provided on an outer peripheral part of the frame. FIG. 5 is perspective view of frame 1 in which outer wall 2E is omitted, and FIG. 6 is a plan view thereof.

Firstly, with reference to FIGS. 1 and 2, loudspeaker 31 according to the exemplary embodiment of the present invention is described.

Loudspeaker 31 includes magnetic circuit 6, diaphragm 10, and loudspeaker frame (hereinafter, referred to as a "frame") 1. Magnetic circuit 6 is configured as an inner magnet type by sandwiching magnet 3 between plate 4 and yoke 5. Yoke 5 of magnetic circuit 6 is coupled to center part 1A of frame 1. That is to say, magnetic circuit 6 is supported by center part 1A. Note here that magnetic circuit 6 is not necessarily limited to the inner magnet type, and magnetic circuit 6 may be formed in any configurations as long as it is supported by center part 1A.

An outer periphery of diaphragm 10 is adhesively bonded to diaphragm adhesive face 1D of outer peripheral part 1B of frame 1 directly or via a diaphragm gasket (not shown). Furthermore, one end of voice coil 8 is coupled to the center part of diaphragm 10. Damper 9 holds voice coil 8 in the center of frame 1 such that the other end opposite to the one end of voice coil 8 is located in magnetic gap 7 of magnetic circuit 6. Then, dust cap 11 is adhesively bonded to a front face part of voice coil 8.

Next, frame 1 is described with reference to FIGS. 3, 4, 5 and 6.

Frame 1 is made of resin. Frame 1 includes center part 1A, outer peripheral part 1B, and connection part 1C connecting center part 1A to outer peripheral part 1B. Outer peripheral part 1B includes outer wall 2E shown in FIGS. 3 and 4, inner wall 1E shown in FIG. 5, and reinforcing ribs 1F provided between outer wall 2E and inner wall 1E. Inner wall 1E is provided with diaphragm adhesive face 1D coupled to diaphragm 10 directly or via the diaphragm gasket, installation face 1J opposite diaphragm adhesive face 1D, and installation part 1H extending outward from installation face 1J for being connected to an outside cabinet. That is to say, installation part 1H is an outside installation part for installing loudspeaker 31 to the outside. Furthermore, outer wall 2E is provided with gasket face 2D that is to be brought into close contact with the outside cabinet.

Center part 1A, connection part 1C, inner wall 1E, reinforcing ribs 1F and installation parts 1H are unitarily molded by injection molding. Furthermore, outer wall 2E is separately formed and bonded to be fixed to reinforcing ribs 1F such that it faces inner wall 1E. For bonding outer wall 2E to reinforcing ribs 1F, adhesive bonding by applying an adhesive agent, welding-bonding by ultrasonic wave or the like, or any other bonding methods can be used.

As mentioned above, by combining inner wall 1E and outer wall 2E with each other as mentioned above, forming a structure by inner wall 1 E, outer wall 2E, diaphragm adhesive face 1D and installation face 1J, and providing reinforcing ribs 1F therein so as to form outer peripheral part 1B, outer peripheral part 1B can be formed as a wall structure having a sufficient strength and having a cavity inside thereof.

In general, since an occupied volume ratio of the outer peripheral part to the entire frame is large, a weight of the outer peripheral part affects greatly on the weight of the entire frame. Therefore, reducing the weight of outer peripheral part 1B by forming outer peripheral part 1B as a wall structure by making the material thickness of outer peripheral part 1B as thin as possible has an extremely large effect in reducing the weight of entire frame 1.

Thus, material thicknesses of inner wall 1E, reinforcing ribs 1F, and outer wall 2E are set to be as thin as possible such that an amount of resin to be used is reduced as small as possible in a range in which a strength necessary as outer peripheral part 1B can be secured. Thus, as compared with a case where a conventional resin frame is used, the weight can be remarkably reduced.

Figure 7A:
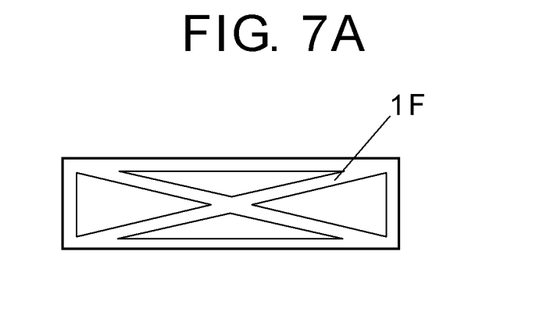
FIG. 7A is a plan view showing a shape of a reinforcing rib in the frame shown in FIG. 5.

Furthermore, each of reinforcing ribs 1F has a cross bracing structure as shown in FIG. 7A on inner wall 1E of outer peripheral part 1B. Forming the cross bracing structure dramatically improves strengths of the outer peripheral part in all the directions, as compared with a case in which reinforcing ribs only in the vertical direction or the horizontal direction are formed.

In other words, when a strength of outer peripheral part 1B is the same, the material thicknesses of the reinforcing ribs can be reduced, or the number of the reinforcing ribs can be reduced. Therefore, an amount of resin to be used can be further reduced, thus enabling further weight reduction, resource saving, and low cost to be achieved.

Figure 7B:
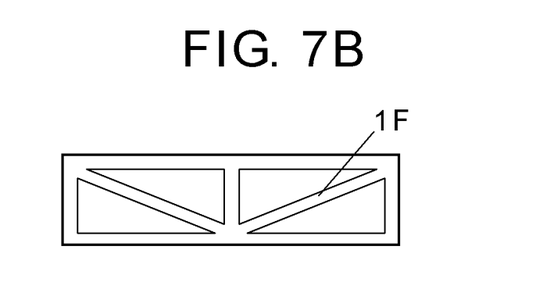
FIG. 7B is a plan view showing another shape of a reinforcing rib in the frame shown in FIG. 5.

Furthermore, the shape of reinforcing ribs 1F may be a truss structure as shown in FIG. 7B on inner wall 1E of outer peripheral part 1B. With this configuration, similar to the above-mentioned cross bracing structure, the strength can be structurally increased. Therefore, while the strength of the outer peripheral part can be secured, the weight reduction of the outer peripheral part and resource saving can be achieved.

Figure 7C:
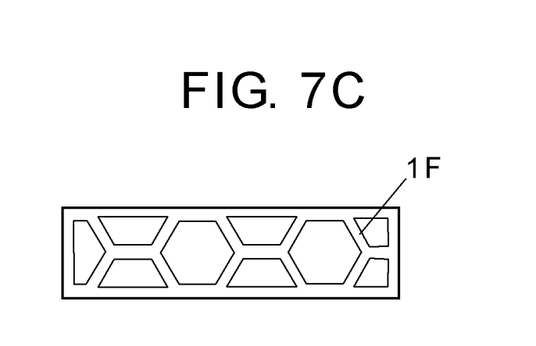
FIG. 7C is a plan view showing still another shape of a reinforcing rib in the frame shown in FIG. 5.

Furthermore, the shape of reinforcing ribs 1F may be a honeycomb structure as shown in FIG. 7C on inner wall 1E of outer peripheral part 1B. With this configuration, similar to the cross bracing structure and the truss structure mentioned above, the strength of the outer peripheral part can be secured while the weight reduction of the outer peripheral part and resource saving can be achieved. As mentioned above, it is preferable that reinforcing ribs 1F are formed in any of the cross bracing structure, the truss structure, and the honeycomb structure on the surface of inner wall 1E.

In frame 1, gasket face 2D is disposed apart from inner wall 1E; however, diaphragm 10 may be sandwiched between gasket face 2D and diaphragm adhesive face 1D of outer peripheral part 1B. With this configuration, the strength of the wall structure of outer peripheral part 1B can be improved.

Furthermore, shock-absorbing material such as cushion material may be provided on gasket face 2D, and it is used so as to have a function as packing material for preventing rub and buzz generated between the outer cabinet and the face, and further taking measures against leakage of air and water.

Next, a shape of frame 1 necessary for achieving weight reduction and resource saving is described.

Connection part 1C connecting center part 1A to outer peripheral part 1B of frame 1 includes three connection sites 11C formed at equal intervals. Since this configuration enables a truss structure having a high structural strength to be formed, a necessary function can be achieved with the minimum number of connection parts 1C. Therefore, the amount of resin of connection part 1C can be minimized. Furthermore, since places of outer peripheral part 1B to which connection part 1C is bound have particularly a high mechanical strength, it is preferable that installation parts 1H are formed at the places. That is to say, it is preferable that frame 1 has installation parts 1H provided on the outer side of outer peripheral part 1B such that they correspond to places to which connection sites 11C are connected. Installation parts 1H are connected to outer peripheral part 1B and extend to the outside of outer peripheral part 1B.

As mentioned above, together with the effect of outer peripheral part 1B, a synergetic effect in weight reduction of frame 1 and resource saving can be exhibited, and weight reduction, resource saving, and low cost can be further achieved.

Furthermore, each connection part 1C may be provided with a lightened portion between center part 1A and outer peripheral part 1B. With this configuration, it is possible to reduce the weight of frame 1 according to the amount of resin reduced by lightened portion 1G.

Lightened portion 1G may be a hole in which the amount of resin in this site is completely eliminated, or may be a recess in which a material thickness in this site is reduced.

Next, resin to be used for frame 1 is described. Examples of the resin to be used for frame 1 include polypropylene. Polypropylene is inexpensive and has excellent moldability, and can satisfy standards for on-vehicle applications in terms of quality and reliability. Therefore, polypropylene is suitable resin for on-vehicle frames.

From the viewpoint of global environmental friendliness, frame 1 may be made of recycled resin or resin containing recycle resin. When frame 1 is made of recycled resin, cost can be remarkably reduced.

When the use of recycled resin causes problems in terms of performance, quality, or reliability, combination of recycled resin and non-recycled resin may be used. In this case, according to the mixing ratio of the recycled resin, cost can be reduced. The mixing ratio may be appropriately adjusted with reduction of cost, performance, quality, and reliability taken into account.

Furthermore, when a strength is desired to be further improved, reinforcement filler such as glass fiber may be mixed into resin. When the reinforcement filler such as glass fiber is mixed, although a little increase of the weight may occur due to a difference in the specific gravity from that of resin, it is possible to secure a strength necessary for a frame whose material thickness is made to be as thin as possible.

On the other hand, when further weight reduction is desired, a frame may be formed by using resin containing a bamboo fiber whose specific gravity is smaller than that of the resin. Since the bamboo fiber is a natural fiber, resource saving can be also achieved, an extremely large synergetic effect can be exhibited from the viewpoint of global environmental friendliness.

As mentioned above, loudspeaker 31 can contribute to global environmental friendliness by weight reduction and resource saving, and the strength of frame 1 can be secured. Therefore, deformation at the time of installation of loudspeaker 31, installation distortion, or the like, can be largely reduced, thus achieving low cost, high quality, and high reliability.

Figure 8:
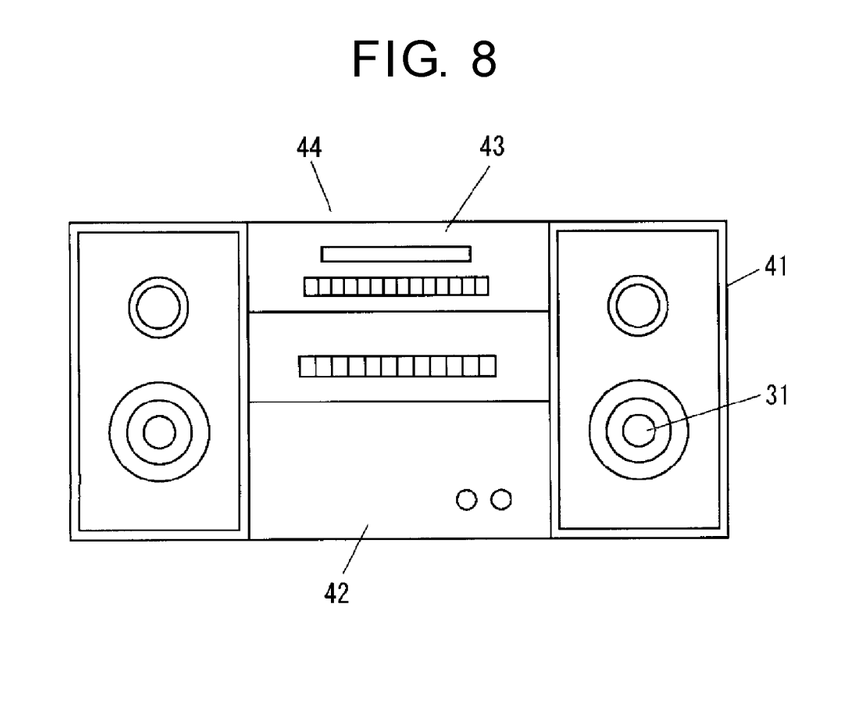
FIG. 8 is an external view of an electronic apparatus according to the exemplary embodiment of the present invention.

Next, an example of an electronic apparatus using loudspeaker 31 is described with reference to FIG. 8. FIG. 8 is an external view of mini audio system 44 as an electronic apparatus in accordance with the exemplary embodiment of the present invention.

A loudspeaker system is configured by incorporating loudspeaker 31 into enclosure 41. Mini audio system 44 includes the loudspeaker systems, amplifier 42 as a section for amplifying an electric signal to be input into loudspeaker 31, and player 43 for outputting a source that is input into amplifier 42. That is to say, mini audio system 44 includes loudspeaker 31, and amplifier 42 as a circuit part for inputting an electric signal into loudspeaker 31.

This configuration can achieve an electronic apparatus that contributes to global environmental friendliness by weight reduction and resource saving.

Furthermore, deformation at the time of installation, installation distortion, or the like, can be largely reduced because a strength of the frame can be secured, thus achieving an electronic apparatus capable of achieving low cost, high quality, and high reliability. Thus, a large effect capable of achieving weight reduction and resource saving, plus low cost, high quality, and high reliability in the electronic apparatus can be exhibited.

Figure 9:
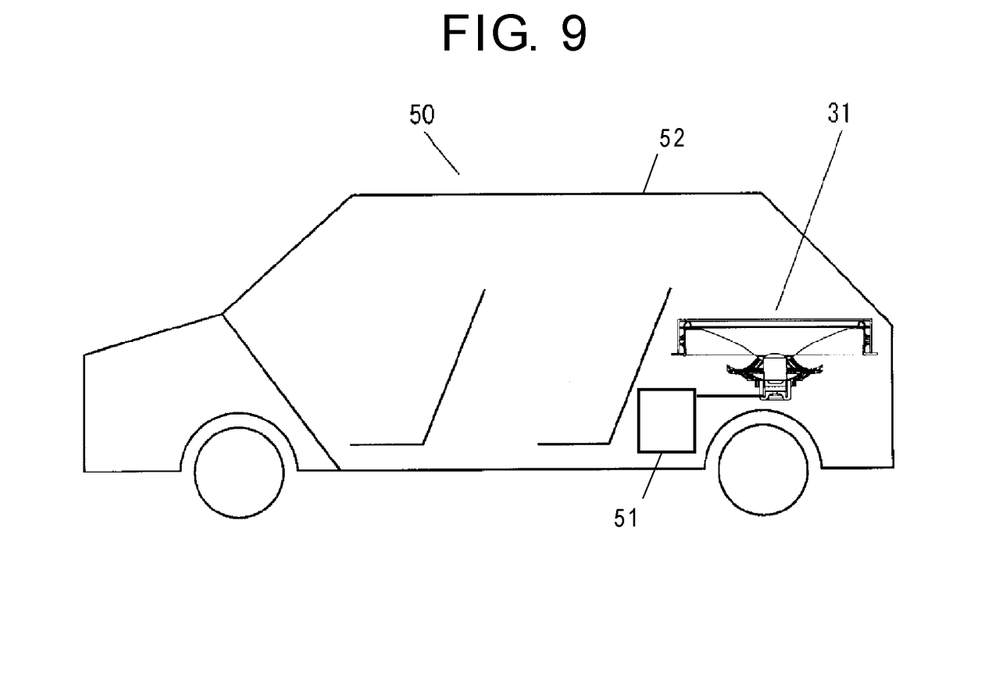
FIG. 9 is a sectional view of a mobile device according to the exemplary embodiment of the present invention.

Next, one example of a mobile device using loudspeaker 31 is described with reference to FIG. 9. FIG. 9 is a sectional view of automobile 50 as the mobile device in accordance with the exemplary embodiment of the present invention.

Automobile 50 is configured by incorporating loudspeaker 31 into a rear tray and/or a front panel such that it is used as a part of a car navigation and/or a car audio system. The car navigation and the car audio system include circuit part 51 for inputting an electric signal into the loudspeaker. That is to say, automobile 50 as a mobile device includes loudspeaker 31, circuit part 51 for inputting an electric signal into loudspeaker 31, and main body 52 capable of moving by itself to which loudspeaker 31 and circuit part 51 are mounted.

A position on which loudspeaker 31 is installed in automobile 50 is not necessarily limited to a rear tray and a front panel, it may be installed to any positions including a door, a ceiling, a pillar portion, an instrument panel part, a floor, and the like.

This configuration can achieve a mobile device that can contribute to global environmental friendliness by achieving fuel consumption of the mobile device by weight reduction and resource saving. Furthermore, deformation at the time of installation, installation distortion, or the like, can be largely reduced because a strength of the frame can be secured, thus achieving a mobile device capable of achieving low cost, high quality, and high reliability. Thus, a large effect capable of achieving weight reduction of the mobile device and resource saving, plus low cost, high quality, and high reliability can be exhibited.

INDUSTRIAL APPLICABILITY

A loudspeaker according to the present invention can be used for applications that require weight reduction and resource saving.

REFERENCE MARKS IN THE DRAWINGS 1 frame
1A center part
1B outer peripheral part
1C connection part
1D diaphragm adhesive face
1E inner wall
1F reinforcing rib
1G lightened portion
1H installation part
2D gasket face
2E outer wall
3 magnet
4 plate
5 yoke
6 magnetic circuit
7 magnetic gap
8 voice coil
9 damper
10 diaphragm
11 dust cap
11C connection site
21 frame
21A center part
21B outer peripheral part
21C connection part
31 loudspeaker
41 enclosure
42 amplifier
43 player
44 mini audio system
50 automobile
51 circuit part
52 main body

The invention claimed is:

1. A loudspeaker comprising:
   a diaphragm;
   a magnetic circuit; and
   a frame molded with resin and including an outer peripheral part supporting the diaphragm, a center part supporting the magnetic circuit, and a connection part connecting the center part to the outer peripheral part,
   wherein the outer peripheral part includes an inner wall, an outer wall facing the inner wall, a diaphragm adhesive face coupled to an outer periphery of the diaphragm, an installation face opposite the diaphragm adhesive face and a reinforcing rib provided between the inner wall and the outer wall,
   the inner wall, the outer wall, the diaphragm adhesive face and the installation face form a structure having a cavity inside thereof, and
   the cavity is a closed space surrounded by the inner wall, the outer wall, the diaphragm adhesive face and the installation face.

2. The loudspeaker according to claim 1, wherein the inner wall and the reinforcing rib are unitarily molded with each other, and the outer wall is coupled to the reinforcing rib.

3. The loudspeaker according to claim 1, wherein the reinforcing rib forms a cross bracing structure on the inner wall.

4. The loudspeaker according to claim 1, wherein the reinforcing rib forms a truss structure on the inner wall.

5. The loudspeaker according to claim 1, wherein the reinforcing rib forms a honeycomb structure on the inner wall.

6. The loudspeaker according to claim 1, wherein the connection part includes connection sites disposed in three places at equal intervals.

7. The loudspeaker according to claim 6, wherein each of the connection sites is provided with one of a hole and a recess.

8. The loudspeaker according to claim 6, wherein the frame further includes outside installation parts provided on an outer side of the outer peripheral part such that the outside installation parts correspond to the places to which the connection sites of the outer peripheral part are connected.

9. The loudspeaker according to claim 1, wherein the frame is formed of the resin including a bamboo fiber.

10. The loudspeaker according to claim 1, wherein the outer wall is extended to an end face of the outer peripheral part, the end face functions as a gasket face to be used for being installed to an outer cabinet.

11. An electronic apparatus comprising:
    the loudspeaker as defined in claim 1; and
    a circuit part configured to input an electric signal into the loudspeaker.

12. A mobile device comprising:
    the loudspeaker as defined in claim 1;
    a circuit part configured to input an electric signal into the loudspeaker; and
    a main body capable of moving by itself to which the loudspeaker and the circuit part are mounted.

* * * * *